(12) United States Patent
Heavner

(10) Patent No.: US 6,412,184 B1
(45) Date of Patent: Jul. 2, 2002

(54) MASONRY LINE BLOCK AND CORNER POLE

(76) Inventor: Charles Eddie Heavner, P.O. Box 362, Cherryville, NC (US) 28021

(*) Notice: Subject to any disclaimer, the term of this patent is extended or adjusted under 35 U.S.C. 154(b) by 91 days.

(21) Appl. No.: 09/591,137

(22) Filed: Jun. 9, 2000

(51) Int. Cl.[7] .............................................. G01C 15/06
(52) U.S. Cl. ...................................... 33/409; 33/1 LE
(58) Field of Search ................................ 33/1 LE, 407, 33/408, 409, 410, 413, 518

(56) References Cited

U.S. PATENT DOCUMENTS

| | | | | |
|---|---|---|---|---|
| 468,660 A | * | 2/1892 | Hyser | 33/409 |
| 2,665,487 A | * | 1/1954 | Mastrella | 33/408 |
| 3,555,688 A | * | 1/1971 | Smathers | 33/408 |
| 3,626,434 A | * | 12/1971 | Miller | 33/408 |
| 3,765,096 A | * | 10/1973 | Simmons et al. | 33/409 |
| 4,631,833 A | * | 12/1986 | Moye | 33/408 |
| 5,479,713 A | * | 1/1996 | Wood | 33/407 |

* cited by examiner

Primary Examiner—G. Bradley Bennett
(74) Attorney, Agent, or Firm—Adams, Schwartz & Evans, P.A.

(57) ABSTRACT

A masonry line block is adapted for use in combination with a vertical corner pole during construction of a structure. The structure has an exterior surface and at least one surface projecting from the exterior surface. The line block engages the corner pole at one end of the structure and cooperates with a line holder located at an opposite end of the structure to carry a tensioned guide line therebetween. The guide line indicates proper placement and alignment of building units used to form the structure. The line block includes a mounting member having first and second, opposing pole-engaging shoulders. The shoulders are adapted for selectively engaging the corner pole to hold the line block in one of first and second alignment positions relative to the structure. An alignment member is formed with the mounting member and extends perpendicularly outwardly from the pole-engaging shoulders. The alignment member has first and second opposing sides and defines a thickness corresponding generally to a distance between the outer surface of the structure and the projecting surface of the structure. In the first alignment position of the line block, the alignment member is adapted for locating the guide line relative to the structure to indicate proper placement and alignment of building units used to form the exterior surface of the structure. In the second alignment position of the line block, the alignment member is adapted for locating the guide line relative to the structure to indicate proper placement and alignment of building units used to form the at least one projecting surface of the structure.

20 Claims, 8 Drawing Sheets

MASONRY LINE BLOCK AND CORNER POLE

TECHNICAL FIELD AND BACKGROUND OF INVENTION

This invention relates to a masonry line block and corner pole used during formation of a structure, such as a residential home, commercial building, privacy wall, and the like. The line block engages the corner pole at one end of the structure and cooperates with a line holder located at an opposite end of the structure to carry a tensioned guide line. The guide line indicates proper placement and alignment of building units, such as bricks or concrete blocks, used to form the structure. The invention is especially applicable for forming decorative quoins common in many residential homes. The decorative quoin, are formed at the junction of intersecting brick walls, and are defined by overlying bricks arranged to project slightly outwardly from respective exterior surfaces of the brick walls. The decorative quoins are generally spaced-apart along one or more corners of the brick structure.

Present methods for forming decorative quoins are tedious and time consuming. The problems result largely from the design of the cooperating line blocks used to carry the tensioned guide line. Prior art line blocks generally have a single mounting shoulder which frictionally engages the corner pole to hold the line block to the corner pole, and a body portion extending perpendicularly outwardly from the mounting shoulder. The line blocks are simultaneously moved vertically up the length of the corner pole as successive courses of brick are laid by the brick mason. For structures with decorative quoins, the corner poles are generally moved and the entire quoin constructed before relocating the corner poles and completing the remainder of the structure. This technique is inefficient and relatively labor intensive Moreover, because the guide line is tensioned between the corner poles, it is not uncommon for a line block to inadvertently slip off a corner pole and strike a nearby worker causing injury.

SUMMARY OF THE INVENTION

Therefore, it is an object of the invention to provide an easy-to-use masonry line block for use in combination with a corner pole and guide line which enables a mason to lay bricks quickly, safely, and in proper alignment without the use of a level or rule.

It is another object of the invention to provide a masonry line block for use in combination with a corner pole and guide line which enables ready and accurate construction of decorative quoins formed in brick structures.

It is another object of the invention to provide a masonry line block for use in combination with a corner pole and guide line which affords the mason freer use of his hands by reducing efforts otherwise required to ensure proper placement and alignment of bricks.

It is another object of the invention to provide a masonry line block for use in combination with a corner pole and guide line which resists inadvertently slipping off the corner pole, and striking and injuring a nearby worker.

It is another object of the invention to provide a masonry line block for use in combination with a corner pole and guide line which reduces overall construction costs by speeding up the construction process.

It is another object of the invention to provide a masonry line block which can be used for setting brick or concrete block out or in around doors, windows, and arches.

It is another object of the invention to provide a masonry line block which can be used to create any projecting or recessed surface on any residential or commercial structure.

It is another object of the invention to provide a masonry corner pole for use in combination with a masonry line block and guide line.

It is another object of the invention to provide a method of forming a structure made of building units, such as brick and concrete block.

These and other objects of the present invention are achieved in the preferred embodiments disclosed below by providing a masonry line block adapted for use in combination with a vertical corner pole during construction of a brick structure. The brick structure has an exterior surface and at least one surface projecting from the exterior surface. The line block engages the corner pole at one end of the brick structure and cooperates with a line holder located at an opposite end of the brick structure to carry a tensioned guide line therebetween. The guide line indicates proper placement and alignment of bricks used to form the brick structure. The line block includes a mounting member having first and second, opposing pole-engaging shoulders. The shoulders are adapted for selectively engaging the corner pole to hold the line block in one of first and second alignment positions relative to the brick structure. An alignment member is formed with the mounting member and extends perpendicularly outwardly from the pole-engaging shoulders. The alignment member has first and second opposing sides and defines a thickness corresponding generally to a distance between the outer surface of the brick structure and the projecting surface of the brick structure. In the first alignment position of the line block, the alignment member is adapted for locating the guide line relative to the brick structure to indicate proper placement and alignment of bricks used to form the exterior surface of the brick structure. In the second alignment position of the line block, the alignment member is adapted for locating the guide line relative to the brick structure to indicate proper placement and alignment of bricks used to form the at least one projecting surface of the brick structure.

According to another preferred embodiment of the invention, an arcuate opening is formed at a junction of the mounting member and one of the first and second opposing sides of the alignment member to accommodate excess guide line wrapped around the line block to the attach the guide line to the line block.

According to another preferred embodiment of the invention, first and second arcuate openings are formed at a junction of the mounting member and respective first and second opposing sides of the alignment member to accommodate excess guide line wrapped around the line block to the attach the guide line to the line block.

According to another preferred embodiment of the invention, a longitudinal groove is formed along one of first and second opposing sides of the alignment member, and is adapted for receiving the guide line therein to secure the position of the guide line relative to the line block.

According to another preferred embodiment of the invention, the distance from the longitudinal groove formed in one side of the alignment member to the opposite side of the alignment member is between 0.5 and 1.0 inches.

According to another preferred embodiment of the invention, the distance from the longitudinal groove formed in one side of the alignment member to the opposite side of the alignment member is approximately 0.625 inches.

According to another preferred embodiment of the invention, the distance from the longitudinal groove formed in one side of the alignment member to the opposite side of the alignment member is approximately 0.75 inches.

According to another preferred embodiment of the invention, the distance from the longitudinal groove formed in one side of the alignment member to the opposite side of the alignment member is approximately 1 inch.

According to another preferred embodiment of the invention, first and second longitudinal grooves are formed along respective first and second opposing sides of the alignment member, and are adapted for selectively receiving the guide line therein to secure the position of the guide line relative to the line block.

According to another preferred embodiment of the invention, the mounting member includes a slot formed through one side thereof, and adapted for receiving an end of the guide line secured to the line block.

According to another preferred embodiment of the invention, the mounting member includes first and second slots formed through respective first and second sides thereof, and adapted for receiving an end of the guide line secured to the line block.

According to another preferred embodiment of the invention, the mounting member and the alignment member are formed of a molded plastic.

According to another preferred embodiment of the invention, the mounting member and the alignment member are formed of wood.

According to another preferred embodiment of the invention, the first and second shoulders of the mounting member include respective first and second outwardly extending anchors adapted for securing the line block to the corner pole.

In another preferred embodiment, the invention is a masonry corner pole adapted for use in combination with a masonry line block during construction of a brick structure. The line block engages the corner pole at one end of the brick structure and cooperating with a line holder located at an opposite end of the brick structure to carry a tensioned guide line therebetween. The guide line indicates proper placement and alignment of bricks used to form the brick structure. The corner pole includes an elongate body having a plurality of sides, and at least one longitudinal edge defined by an intersecting two of the plurality of sides. A longitudinal anchor flange is formed with the elongate body adjacent the longitudinal edge, and is adapted for engaging the line block to secure the line block to the corner pole during formation of the brick structure.

According to another preferred embodiment of the invention, the elongate body has four sides defining four spaced-apart longitudinal edges.

According to another preferred embodiment of the invention, first and second longitudinal anchor flanges are formed with the elongate body adjacent two of the four longitudinal edges. The anchor flanges are adapted for selectively engaging the line block to secure the line block to the corner pole during formation of the brick structure.

According to another preferred embodiment of the invention, the first and second longitudinal anchor flanges extend perpendicular to each other and are formed at opposing edges of the elongate body.

In yet another preferred embodiment, the invention is a combination masonry line block and corner pole adapted for use during construction of a brick structure having an exterior surface and at least one surface projecting from the exterior surface. The line block engages the corner pole at one end of the brick structure and cooperating with a line holder located at an opposite end of the brick structure to carry a tensioned guide line therebetween. The guide line indicates proper placement and alignment of bricks used to form the brick structure. The corner pole includes an elongate body having a plurality of sides, and at least one longitudinal edge defined by an intersecting two of the plurality of sides. A longitudinal anchor flange is formed with the elongate body adjacent the longitudinal edge, and is adapted for engaging the line block to secure the line block to the corner pole during formation of the brick structure.

In yet another preferred embodiment, the invention is a method for indicating proper placement and alignment of bricks used to form a brick structure having an exterior surface and at least one surface projecting from the exterior surface. The method includes the steps of securing a masonry line block to a masonry corner pole mounted at one end of the brick structure. The line block engages the corner pole at one end of the brick structure and cooperating with a line holder located at an opposite end of the brick structure to carry a tensioned guide line therebetween. The line block is arranged in one of first and second alignment positions on the corner pole for locating the guide line relative to the brick structure to indicate proper placement and alignment of bricks used to form the exterior surface of the brick structure. The line block is then arranged to reside in the other of the first and second alignment positions on the corner pole for locating the guide line relative to the brick structure to indicate proper placement and alignment of bricks used to form the at least one projecting surface of the brick structure.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
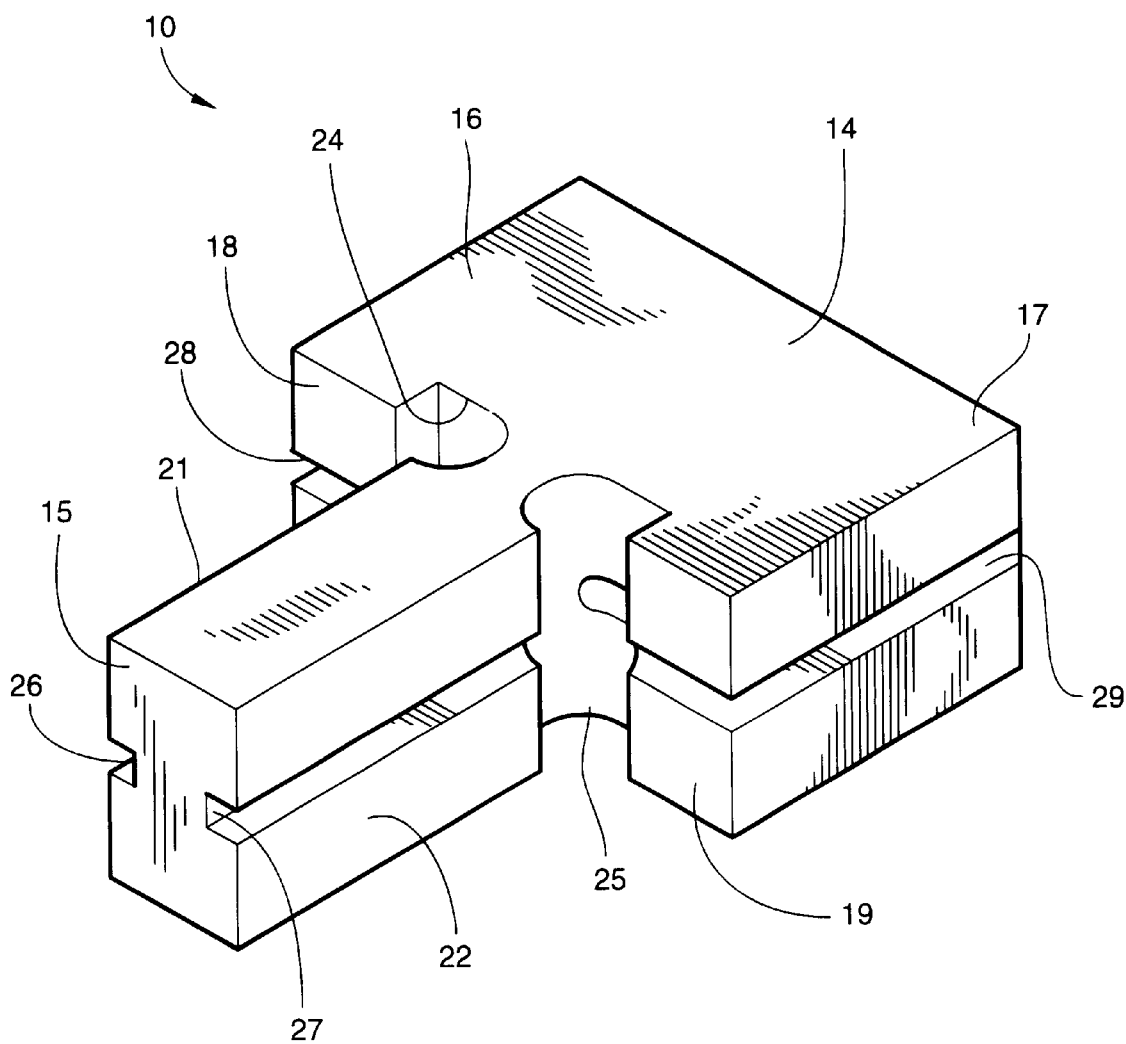
FIG. 1 is a perspective view of a masonry line block according to one preferred embodiment of the invention.

Referring now specifically to the drawings, a masonry line block according to the present invention is illustrated in FIG. 1 and shown generally at reference numeral 10. The line block 10 is generally used in pairs in combination with a masonry corner pole 11, such as shown in FIGS. 6–10, to construct a brick structure "S" including decorative quoins "Q". The decorative quoins "Q" are formed at the junction of intersecting brick walls "W", and are defined by overlying bricks arranged to project slightly outwardly from respective exterior surfaces of the brick walls "W". The decorative quoins "Q" are vertically spaced-apart along one or more corners of the brick structure "S". The line blocks 10 and 10' cooperate with the corner pole 11 and respective line holders (not shown) located at opposite ends of each brick wall "W" to carry respective tensioned guide lines 12 and 12' used to maintain proper placement and alignment of the brick courses. The line holders may be additional corner poles or other structure sufficient for holding the guide lines 12 and 12' in a tensioned condition.

Figure 2:
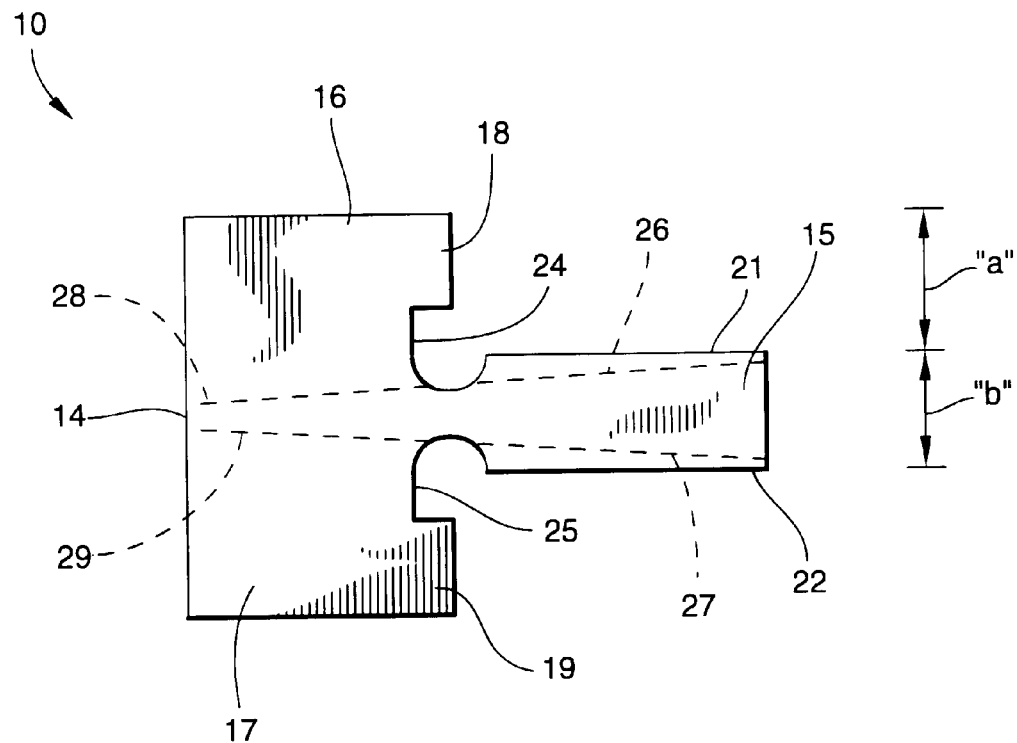
FIG. 2 is a plan view of the masonry line block with the slots and grooves formed respectively in the mounting member and the alignment member shown in phantom.
Figure 3:
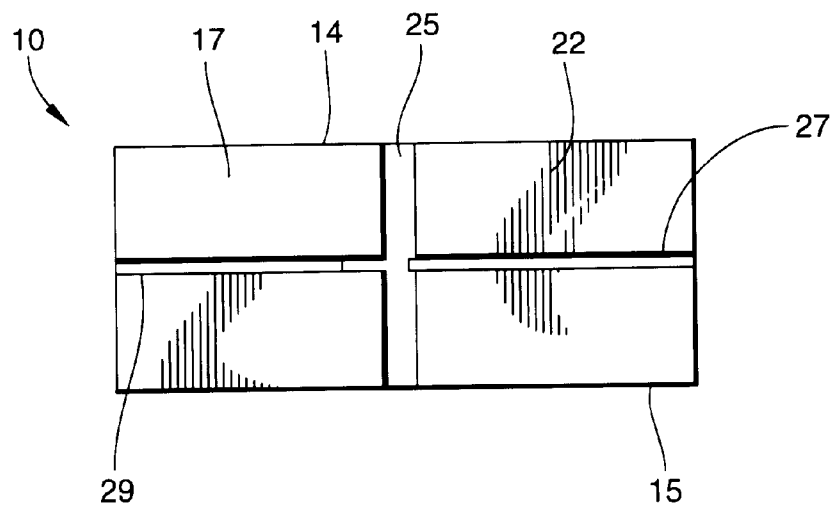
FIG. 3 is a side elevational view of the masonry line block.
Figure 4:
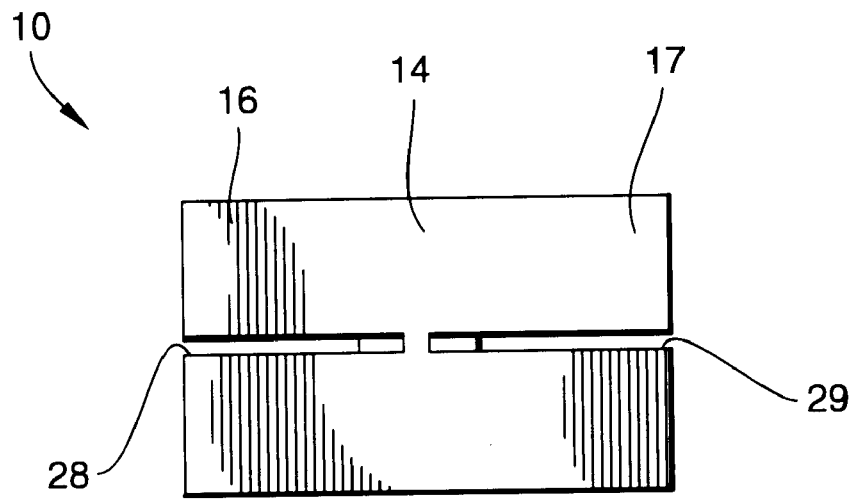
FIG. 4 is a back end view of the masonry line block.
Figure 5:
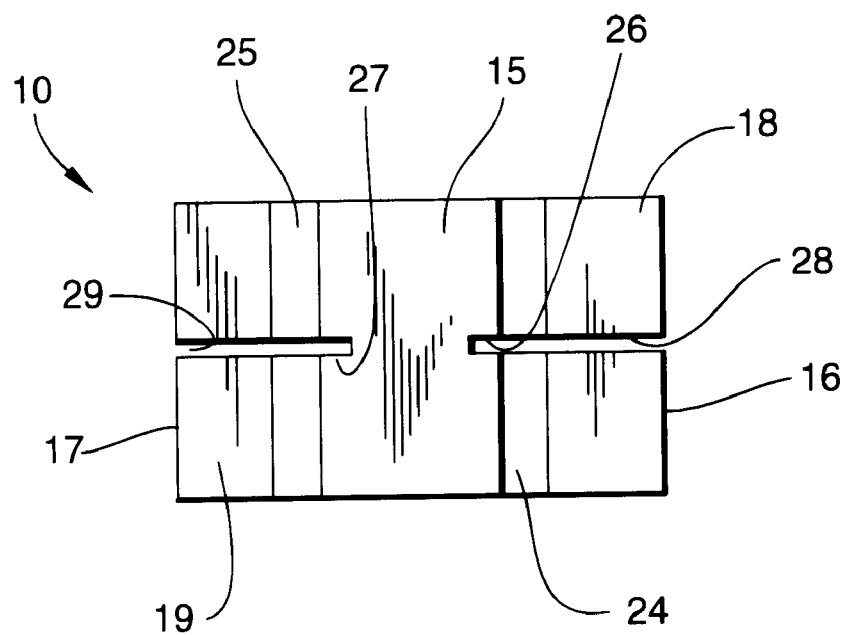
FIG. 5 is a front end view of the masonry line block.
Figure 6:
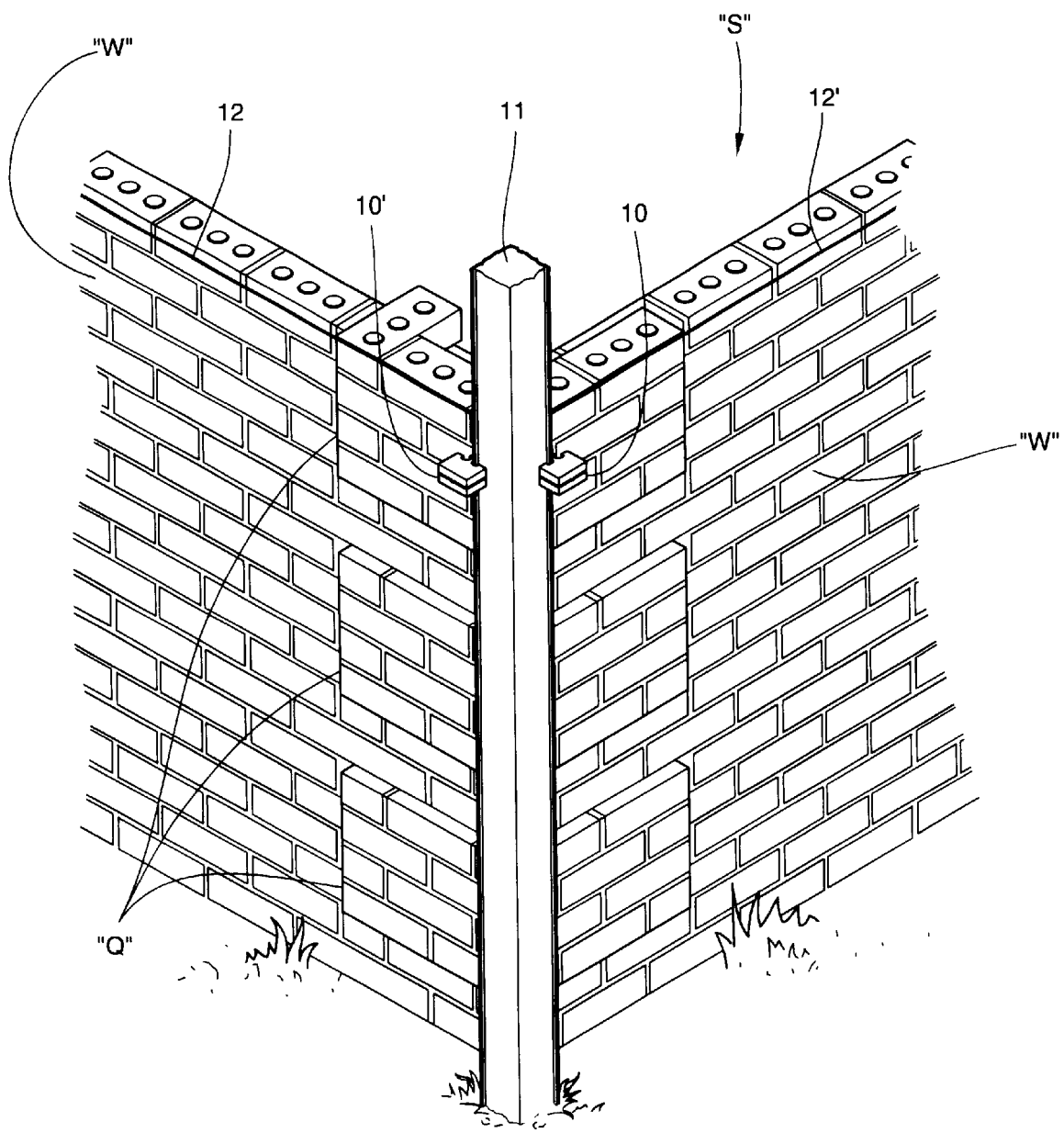
FIG. 6 is a fragmentary perspective view of a brick structure being constructed using masonry line blocks and a corner pole of the present invention.

Referring to FIGS. 1–5, the line block 10 is generally T-shaped and includes an integrally formed mounting member 14 and alignment member 15. The mounting member 14 has opposing, pole-engaging shoulders 16 and 17 with respective anchors 18 and 19 adapted for securing the line block 10 to the corner pole 11, as described further below. The alignment member 15 extends perpendicularly outward from the mounting member 14 between the opposing shoulders 16 and 17, and has first and second opposing sides 21 and 22. Arcuate openings 24 and 25 are preferably formed at a junction of the mounting member 14 and respective opposing sides 21 and 22 of the alignment member 15 to accommodate excess guide line 12 wrapped around the line block 10 to attach the guide line 12 to the line block 10. Shallow grooves 26 and 27 are formed in the sides 21 and 22 of the alignment member 15 to selectively receive and secure the position of the guide line 12 as it extends outwardly from the line block 10 towards the distant line holder located at the opposite end of the brick wall "W". Preferably, the mounting member 14 includes corresponding slots 28 and 29 formed in registration with the grooves 26 and 27 to receive an end of the guide line 12 attached to the line block 10. As best shown in FIG. 2, the slots 28 and 29 taper outwardly from the back end of the mounting member 14 and meet the grooves 26 and 27 extending to the front end of the alignment member 15.

According to one preferred embodiment, the distance "a", shown in FIG. 2, from one side 21 of the alignment member 15 to an outside edge of the anchor 18 is approximately ⅝ inches. The distance "b" from a front end of the groove 26 formed in one side 21 of the alignment member 15 to the opposite side 22 of the alignment member is between ⅝ and 1 inches, and is preferably either ⅝, ¾, or 1 inches depending on the desired distance between the exterior surface of the quoin "Q" and the exterior surface of the brick wall "w". The overall length of the line block is 3 inches.

Referring now to FIGS. 6–10, cooperating line blocks 10 and 10' are shown as used in combination with the masonry corner pole 11 to form a brick structure "S" having intersecting brick walls "WW" and decorative quoins "Q" formed at a corner of the structure. Like elements of the line block 10' are shown in prime notation. The corner pole 11 is vertically mounted at the corner of the brick structure "S" and has an elongate body portion 31 with four sides defining four equally spaced-apart longitudinal edges 32, 33, 34, and 35. First and second longitudinal anchor flanges 36 and 38 are formed at a diagonally-opposing two of the four longitudinal edges 32–35. The anchor flange 36, 38 extends into the open space formed between the inside edge of the anchor 18, 19 and the side 21, 22 of the alignment member 15 to secure the line block 10 to the corner pole 11. The tensioned guide lines 12 and 12' are attached to the line blocks 10 and 10' and extend from the corner pole 11 to respective opposite ends of the brick walls "W". The line blocks 10 and 10' are moved vertically up the length of the corner pole 11 to position the guide lines 12 and 12' accordingly when laying successive courses of brick.

Figure 7:
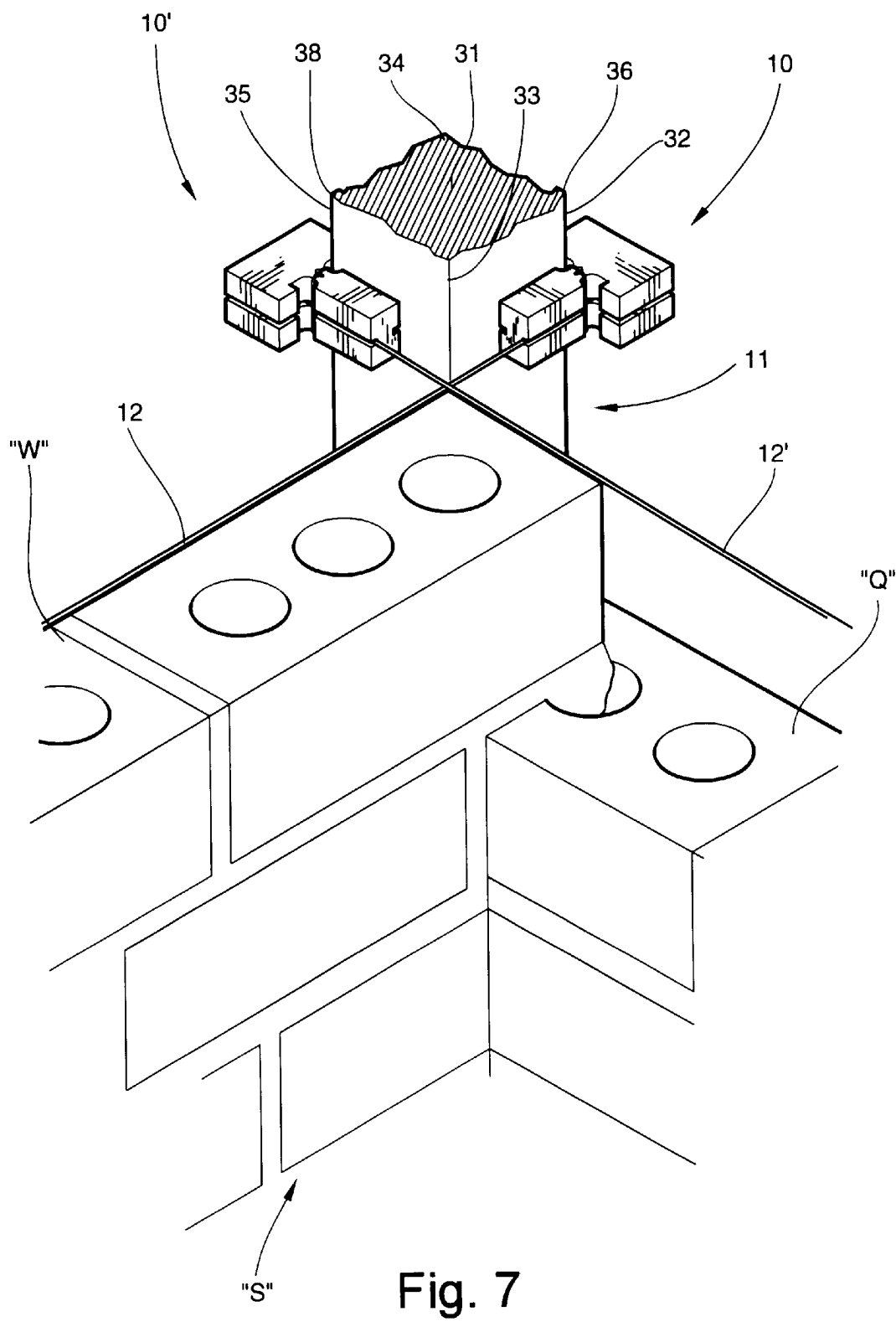
FIG. 7 is an enlarged, fragmentary perspective view showing two masonry line blocks and a corner pole with the line blocks oriented on the corner pole in a first alignment position adapted for positioning the guide line to indicate the placement of bricks used to form the brick wall of the brick structure.
Figure 9:
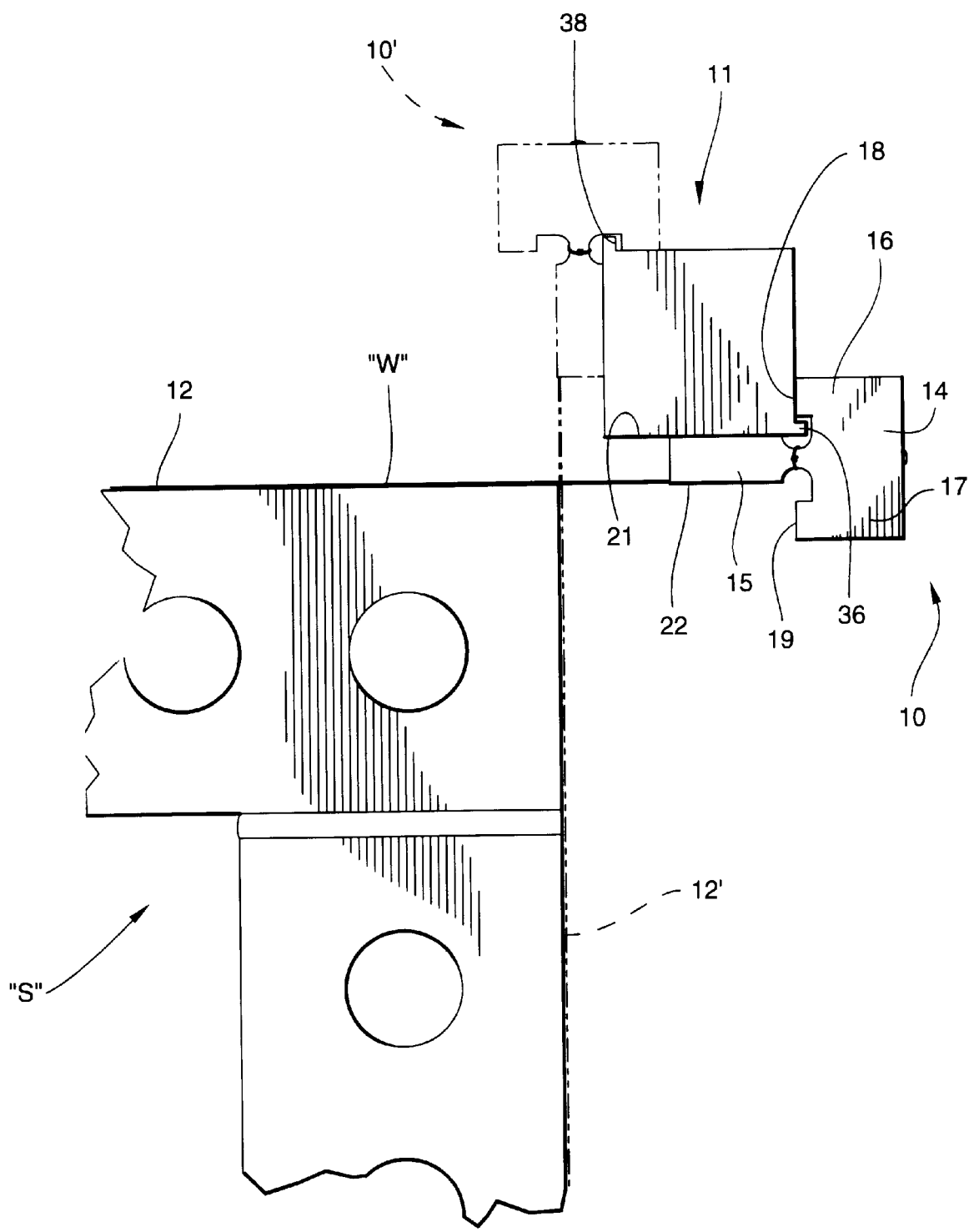
FIG. 9 is an enlarged, fragmentary plan view showing two masonry line blocks and a corner pole with the line blocks oriented on the corner pole in the first alignment position adapted for positioning the guide line to indicate the placement of bricks used to form the brick wall of the brick structure.

When laying bricks to form the brick wall "W" of the brick structure "S", the line block 10 is oriented, as shown in FIGS. 7 and 9, such that one shoulder 16 of the mounting member 14 engages the corner pole 11 while the alignment member 15 acts to space the guide line 12 away from the corner pole 11 and closer to the brick wall "W". The guide line 12 serves to indicate the proper placement of bricks as necessary to maintain precise vertical alignment of the brick wall exterior. The line block 10 remains oriented on the corner pole 11 in this alignment position and is slid upwardly along the length of the corner pole 11 until the mason is ready to form a decorative quoin "Q". The longitudinal anchor flange 36 of the corner pole 11 and anchor 18 formed with the mounting member 14 cooperate to prevent the line block 10 from inadvertently flying off the corner pole 11 under the tension of the guide line 12.

Figure 8:
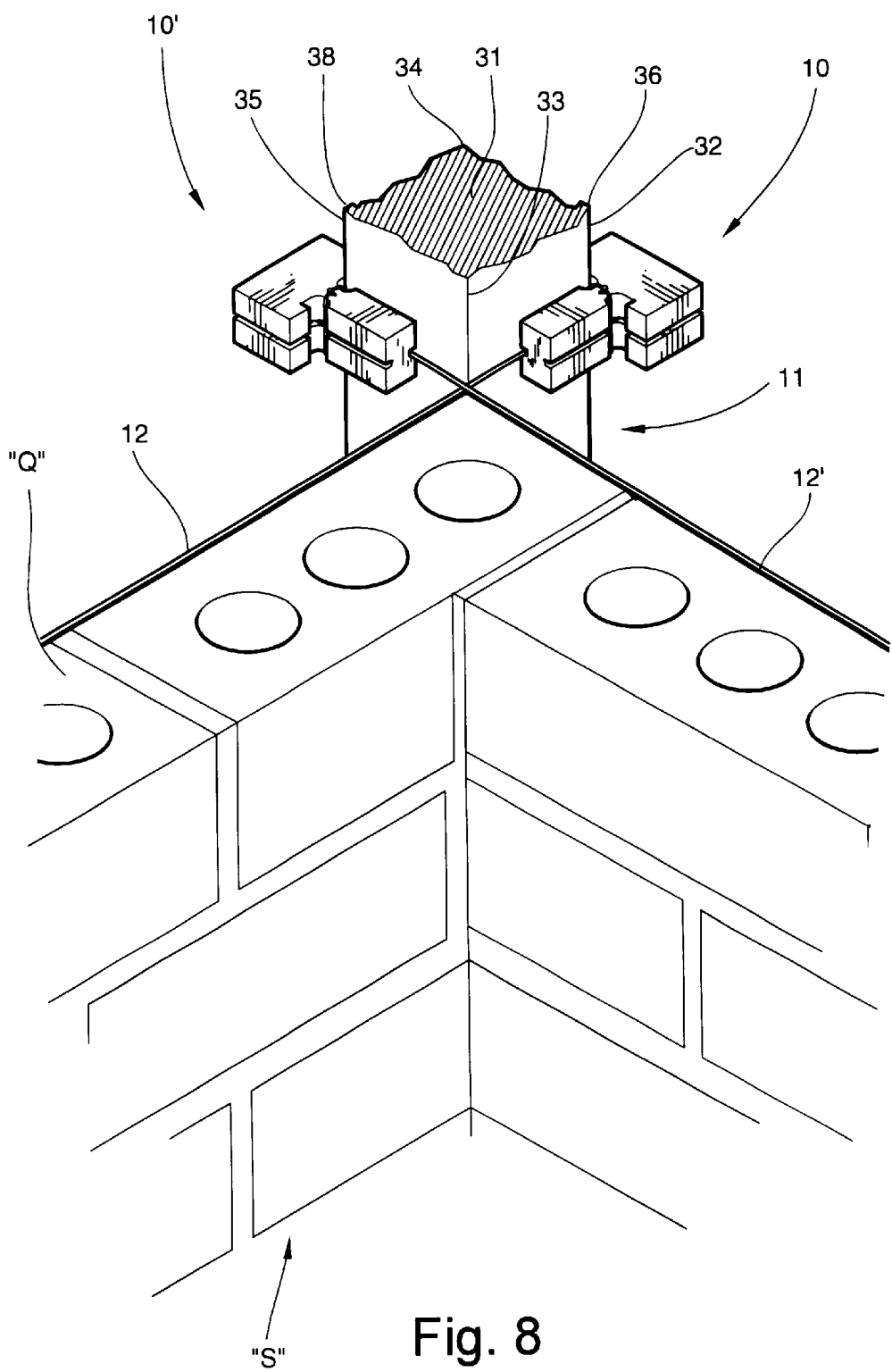
FIG. 8 is an enlarged, fragmentary perspective view showing two masonry line blocks and a corner pole with the line blocks oriented on the corner pole in a second alignment position adapted for positioning the guide line to indicate the placement of bricks used to form the decorative quoin of the brick structure.
Figure 10:
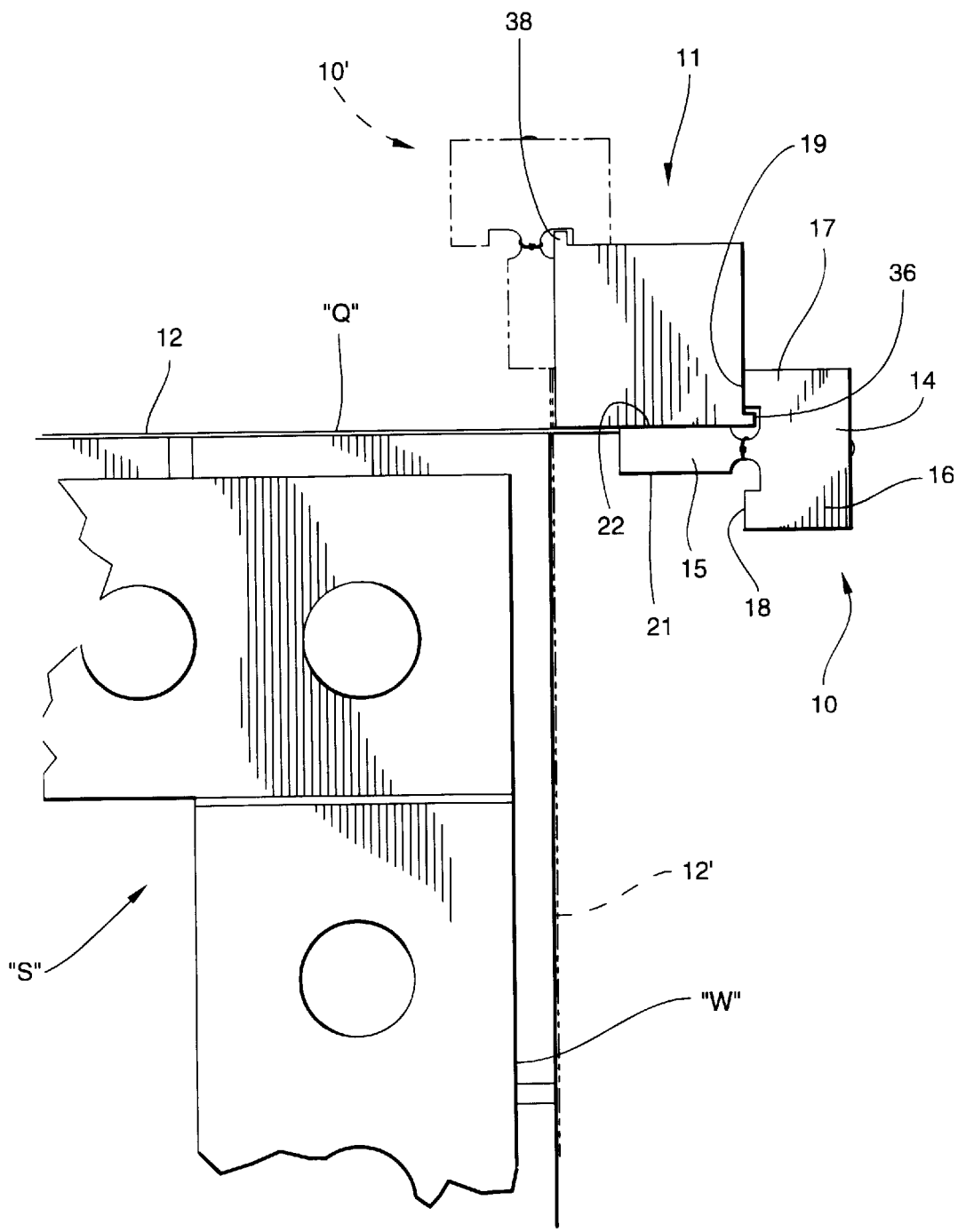
FIG. 10 is an enlarged, fragmentary plan view showing two masonry line blocks and a corner pole with the line blocks oriented on the corner pole in the second alignment position adapted for positioning the guide line to indicate the placement of bricks used to form the decorative quoin of the brick structure.

To form the quoin "Q", the mason simply flips the line block 180 degrees to the alignment position shown in FIGS. 8 and 10 such that the opposite shoulder 17 of the mounting member 14 engages the corner pole 11 while the alignment member 15 positions the guide line 12 directly adjacent a side of the corner pole 11 and away from the previously formed exterior of the brick wall "W". The longitudinal anchor flange 36 and anchor 19 formed with the mounting member 14 now cooperate to prevent the line block 10 from inadvertently flying off the corner pole 11, as described above. After the first brick course of the decorative quoin "Q" is laid, the mason flips the line block 180 degrees back to its original alignment position on the corner pole 11 to position the guide line 12 for placement of the next course of bricks used to form the brick wall "W". When the mason reaches the quoin "Q", the line block 10 is again flipped 180 degrees to position the guide line 12 for laying the next course of bricks used to form the quoin "Q". This process is repeated until construction of the brick structure "S" is completed. Preferably, the process takes place using two line blocks 10 and 10' mounted on a single corner pole 11, as shown, such that each brick wall "W" and each side of the decorative quoin "Q" are formed at the same time. The line block 10' functions in an identical manner described above with reference to line block 10, and is secured to the corner pole 11 by the anchor flange 38.

The line block 10 may be constructed of any suitable material, such as wood, molded plastic, or aluminum. The line block 10 may be used in combination with the masonry corner pole 11, described above, or in combination with any other conventional corner pole. Likewise, the masonry corner pole 11 is further applicable for use in combination with any other conventional line block.

A masonry line block and corner pole are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A masonry line block adapted for use in combination with a vertical corner pole during construction of a structure having an exterior surface and at least one surface projecting from the exterior surface, the line block engaging the corner pole at one end of the structure and cooperating with a line holder located at an opposite end of the structure to carry a tensioned guide line therebetween, the guide line indicating proper placement and alignment of building units used to form the structure, said line block comprising:
   (a) a mounting member including first and second, opposing pole-engaging shoulders adapted for selectively engaging the corner pole to hold said line block in one of first and second alignment positions relative to the structure;
   (b) an alignment member formed with said mounting member and extending perpendicularly outwardly from said pole-engaging shoulders, said alignment member having first and second opposing sides and defining a thickness corresponding generally to a distance between the outer surface of the structure and the projecting surface of the structure, such that:
      i. in the first alignment position of said line block, said alignment member is adapted for locating the guide line relative to the structure to indicate proper placement and alignment of building units used to form the exterior surface of the structure; and
      ii. in the second alignment position of said line block, said alignment member is adapted for locating the guide line relative to the structure to indicate proper placement and alignment of building units used to form the at least one projecting surface of the structure.

2. A masonry line block according to claim 1, and comprising an arcuate opening formed at a junction of said mounting member and one of said first and second opposing sides of said alignment member to accommodate excess guide line wrapped around said line block to the attach the guide line to said line block.

3. A masonry line block according to claim 1, and comprising first and second arcuate openings formed at a junction of said mounting member and respective first and second opposing sides of said alignment member to accommodate excess guide line wrapped around said line block to the attach the guide line to said line block.

4. A masonry line block according to claim 1, and comprising a longitudinal groove formed along one of first and second opposing sides of said alignment member, and adapted for receiving the guide line therein to secure the position of the guide line relative to said line block.

5. A masonry line block according to claim 4, wherein the distance from the longitudinal groove formed in one side of said alignment member to the opposite side of said alignment member is between 0.5 and 1.0 inches.

6. A masonry line block according to claim 4, wherein the distance from the longitudinal groove formed in one side of said alignment member to the opposite side of said alignment member is approximately 0.625 inches.

7. A masonry line block according to claim 4, wherein the distance from the longitudinal groove formed in one side of said alignment member to the opposite side of said alignment member is approximately 0.75 inches.

8. A masonry line block according to claim 4, wherein the distance from the longitudinal groove formed in one side of said alignment member to the opposite side of said alignment member is approximately 1 inch.

9. A masonry line block according to claim 1, and comprising first and second longitudinal grooves formed along respective first and second opposing sides of said alignment member, and adapted for receiving the guide line therein to secure the position of the guide line relative to said line block.

10. A masonry line block according to claim 1, wherein said mounting member includes a slot formed through one side thereof, and adapted for receiving an end of the guide line secured to said line block.

11. A masonry line block according to claim 1, wherein said mounting member includes first and second slots formed through respective first and second sides thereof, and adapted for receiving an end of the guide line secured to said line block.

12. A masonry line block according to claim 1, wherein said mounting member and said alignment member are formed of a molded plastic.

13. A masonry line block according to claim 1, wherein said mounting member and said alignment member are formed of wood.

14. A masonry line block according to claim 1, wherein said first and second shoulders of said mounting member comprise respective first and second outwardly extending anchors adapted for securing said line block to the corner pole.

15. A masonry corner pole adapted for use in combination with a masonry line block during construction of a structure, the line block engaging said corner pole at one end of the structure and cooperating with a line holder located at an opposite end of the structure to carry a tensioned guide line therebetween, the guide line indicating proper placement and alignment of building units used to form the structure, said corner pole comprising:
   (a) an elongate body having a plurality of sides, and at least one longitudinal edge defined by an intersecting two of said plurality of sides; and
   (b) a longitudinal anchor flange formed with said elongate body adjacent said longitudinal edge, and adapted for engaging the line block to secure the line block to said corner pole during formation of the structure.

16. A masonry corner pole according to claim 15, wherein said elongate body has four sides defining four spaced-apart longitudinal edges.

17. A masonry corner pole according to claim 16, and comprising first and second longitudinal anchor flanges formed with said elongate body adjacent two of said four longitudinal edges, and adapted for selectively engaging the line block to secure the line block to said corner pole during formation of the structure.

18. A masonry corner pole according to claim 17, wherein said first and second longitudinal anchor flanges extend perpendicular to each other and are formed at diagonally-opposing edges of said elongate body.

19. In combination with a masonry line block, a corner pole adapted for use during construction of a structure having an exterior surface and at least one surface projecting from the exterior surface, said line block engaging said corner pole at one end of the structure and cooperating with a line holder located at an opposite end of the structure to carry a tensioned guide line therebetween, the guide line indicating proper placement and alignment of building units used to form the structure, said corner pole comprising:

(a) an elongate body having a plurality of sides, and at least one longitudinal edge defined by an intersecting two of said plurality of sides; and (b) a longitudinal anchor flange formed with said elongate body adjacent said longitudinal edge, and adapted for engaging said line block to secure said line block to said corner pole during formation of the structure.

20. A method for indicating proper placement and alignment of building units used to form a structure having an exterior surface and at least one surface projecting from the exterior surface, said method comprising the steps of:

(a) securing a masonry line block to a masonry corner pole mounted at one end of the structure, the line block engaging the corner pole at one end of the structure and cooperating with a line holder located at an opposite end of the structure to carry a tensioned guide line therebetween;

(b) arranging the line block in one of first and second alignment positions on the corner pole for locating the guide line relative to the structure to indicate proper placement and alignment of building units used to form the exterior surface of the structure; and (c) arranging the line block to reside in the other of said first and second alignment positions on the corner pole for locating the guide line relative to the structure to indicate proper placement and alignment of building units used to form the at least one projecting surface of the structure.

* * * * *